United States Patent
Barnett

(10) Patent No.: US 6,971,016 B1
(45) Date of Patent: Nov. 29, 2005

(54) AUTHENTICATED ACCESS TO STORAGE AREA NETWORK

(75) Inventor: Barry Stanley Barnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 09/583,711

(22) Filed: May 31, 2000

(51) Int. Cl.[7] .................. G06F 11/30; G06F 15/173; G06F 15/16; G06F 12/00; H04L 9/00

(52) U.S. Cl. .............. 713/182; 713/165; 713/200; 713/201; 713/202; 380/277; 380/278; 709/223; 709/224; 709/225; 709/226; 709/229; 711/4; 711/100; 711/112; 711/114

(58) Field of Search ............... 713/200–202, 713/165, 182; 711/4, 100, 114, 112, 164; 709/223–226, 709/229; 380/277–278

(56) References Cited

U.S. PATENT DOCUMENTS

| | | | | |
|---|---|---|---|---|
| 5,941,972 A | * | 8/1999 | Hoese et al. | 710/315 |
| 6,061,794 A | * | 5/2000 | Angelo et al. | 713/200 |
| 6,212,606 B1 | * | 4/2001 | Dimitroff | 711/147 |
| 6,260,120 B1 | * | 7/2001 | Blumenau et al. | 711/152 |
| 6,493,825 B1 | * | 12/2002 | Blumenau et al. | 713/168 |
| 6,665,714 B1 | * | 12/2003 | Blumenau et al. | 709/222 |
| 6,714,968 B1 | * | 3/2004 | Prust | 709/219 |

OTHER PUBLICATIONS

PC Magazine, May 25, 1999, S8(1).*

* cited by examiner

*Primary Examiner*—Ayaz Sheikh
*Assistant Examiner*—Jenise Jackson
(74) *Attorney, Agent, or Firm*—Joseph P. Lally; Mark E. McBurney

(57) ABSTRACT

A method and system for authenticating access to a storage area network (SAN) is disclosed in which a password is retrieved from a first copy of a password table in response to an access (login) request, the first copy of the password table residing on a switch and corresponding to a switch port. The password is used to retrieve a response from the first copy of the password table. The response is encrypted according to a first copy of an encryption key stored on the switch. The encrypted password is then sent to the node requesting access to the SAN, where it is decrypted according to a second copy of the encryption key residing on the node. The decrypted password is used to retrieve a response from a second copy of the password table residing on the node. The response is encrypted according to the second copy of the encryption key and sent back to the switch port. The response received from the node is then compared with the response determined from the first copy of the password table. Access to the SAN is permitted if the two responses match and denied otherwise. The method further includes a mechanism for generating codes based on hardware serial ID numbers (or other unique values) and comparing the serial ID numbers against previously stored codes to determine if the hardware serial numbers have changed and allowing or denying access to the SAN based upon that determination.

12 Claims, 7 Drawing Sheets

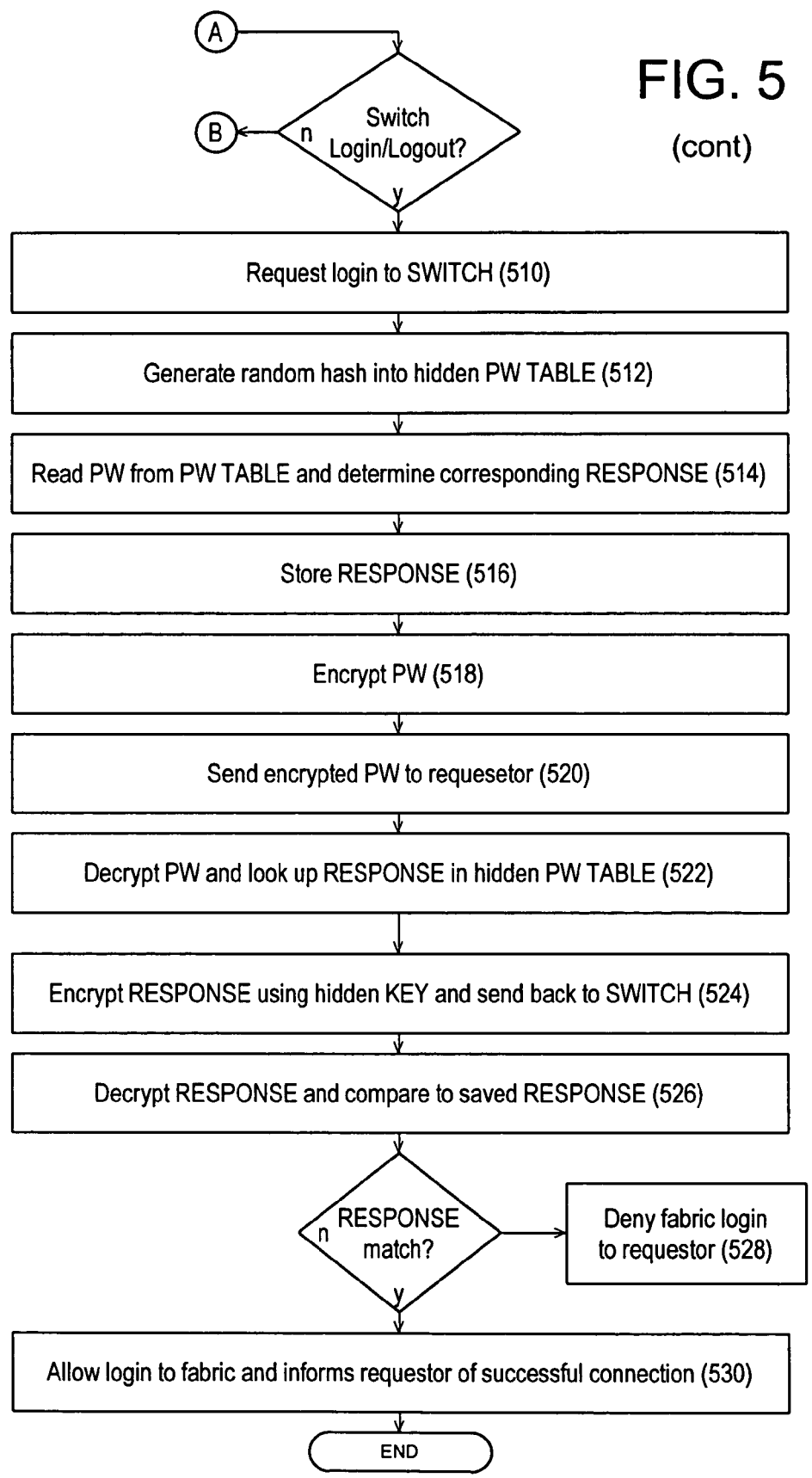

AUTHENTICATED ACCESS TO STORAGE AREA NETWORK

BACKGROUND

1. Field of the Present Invention

The present invention generally relates to the field of data processing and more particularly to a method and implementation for secured or authenticated access to a storage area network, particularly, a Fibre Channel compliant storage area network.

2. History of Related Art

In the field of data processing, the rapidly growing number of data intensive applications has produced a seemingly insatiable demand for raw data storage capacity. Meeting the demands of applications such as data warehousing, data mining, on-line transaction processing, and multimedia internet and intranet browsing requires approximately twice as much new storage capacity each year. In addition, the number of network connections for server-storage subsystems is also rapidly increasing. With the rise of client networking, data intensive computing applications, and electronic communications applications, virtually all network stored data is mission critical. Increased reliance on being able to access networked stored data is challenging the limitations of traditional server-storage systems. As a result, adding more storage, servicing more users, and backing up more data have become never ending tasks. The parallel Small Computer System Interface (SCSI) bus widely used for server-storage connectivity on Local Area Network (LAN) servers is imposing severe limits on network storage. Compounding these limits is the traditional use of LAN connections for server-storage backup which detracts from usable client bandwidth.

The Storage Area Network (SAN) is an emerging data communications platform that interconnects servers and storage at Gigabaud speeds. SAN attempts to eliminate the bandwidth bottlenecks and scalability limitations imposed by SCSI architectures by integrating LAN networking models with the core building blocks of server performance and mass storage capacity. The Fibre Channel protocol is a widely endorsed open standard for the SAN environment. Fibre Channel combines high bandwidth and high scalability with multiple protocol support, including SCSI and IP, over a single physical connection. This enables the SAN to serve as both a server interconnect and as a direct interface to storage devices and storage arrays.

Unfortunately, the openness that is at least partially responsible for the increasing prevalence of Fibre Channel storage area networks, creates a potentially significant security issue for a tremendous number of large (as well as small) and highly valued databases. As an open standard, the Fibre Channel network is susceptible to many of the same security concerns as the Internet. A malicious hacker who was able to gain control of a host bus adapter connected to a Fibre Channel switch may be able to alter, delete, or otherwise damage data across the entire SAN. An unauthorized user who gains access to a Fibre Channel fabric attached element can compromise a Fibre Channel switch in at least three ways. First, the user may write software to use the existing Fibre Channel device interface to compromise the fabric operating environment. Second, the user could install device level drivers that try to compromise the fabric operating environment at the Fibre Channel physical and signaling interface (FC-PH) level. Third, the user could install a doctored host bus adapter that has hardware or micro-code that tries to exploit the fabric operating environment at the FC-PH level. Therefore, it would be highly desirable to implement a secure and cost effective mechanism for assuring the integrity of transactions that occur on a SAN network.

SUMMARY OF THE INVENTION

The problem identified above is addressed in the present invention by a method and system for authenticated access to a storage area network (SAN). Initially, a password is retrieved from a first copy of a password table in response to an access (login) request, the first copy of the password table residing on a switch and corresponding to a switch port. The password is used to retrieve a response from the first copy of the password table. The response is encrypted according to a first copy of an encryption key stored on the switch. The encrypted password is then sent to the node requesting access to the SAN, where it is decrypted according to a second copy of the encryption key residing on the node. The decrypted password is used to retrieve a response from a second copy of the password table residing on the node. The response is encrypted according to the second copy of the encryption key and sent back to the switch port. The response received from the node is then compared with the response determined from the first copy of the password table. Access to the SAN is permitted if the two responses match and denied otherwise. The method further includes a mechanism for generating codes based on hardware serial ID numbers (or other unique values) and comparing the serial ID numbers against previously stored codes to determine if the hardware serial numbers have changed and allowing or denying access to the SAN based upon that determination.

BRIEF DESCRIPTION OF THE DRAWINGS

Other objects and advantages of the invention will become apparent upon reading the following detailed description and upon reference to the accompanying drawings in which.

Figure 1A:
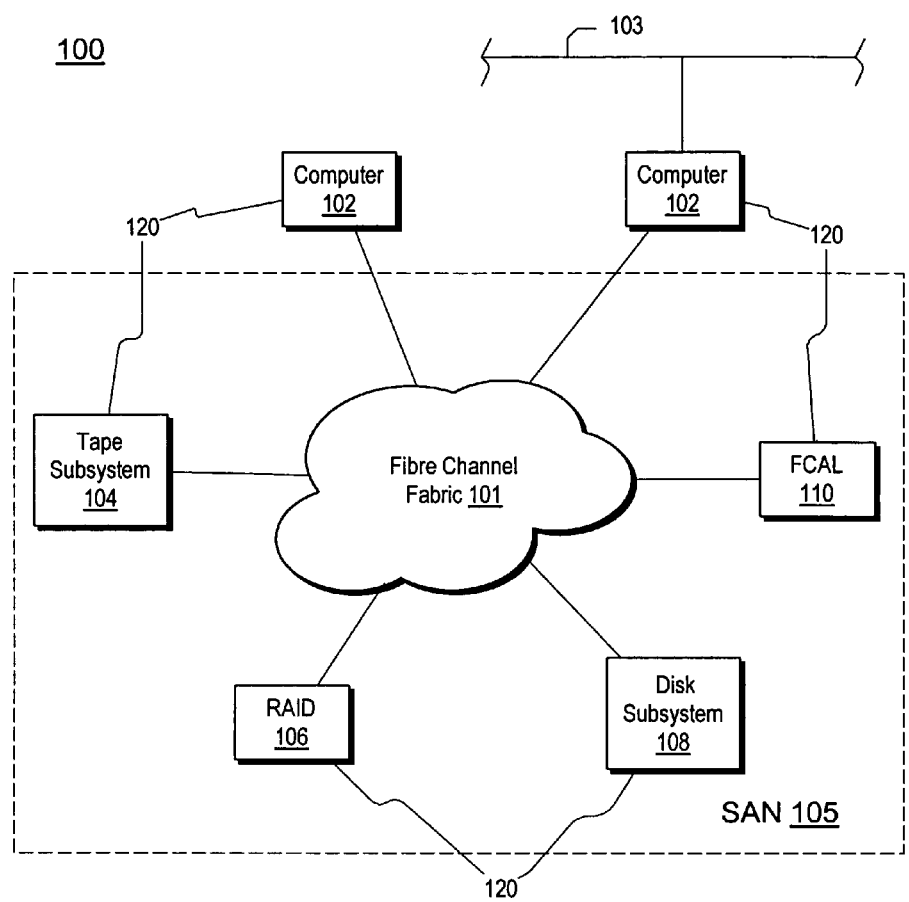
FIG. 1A illustrates one embodiment of a storage area network suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 1B:
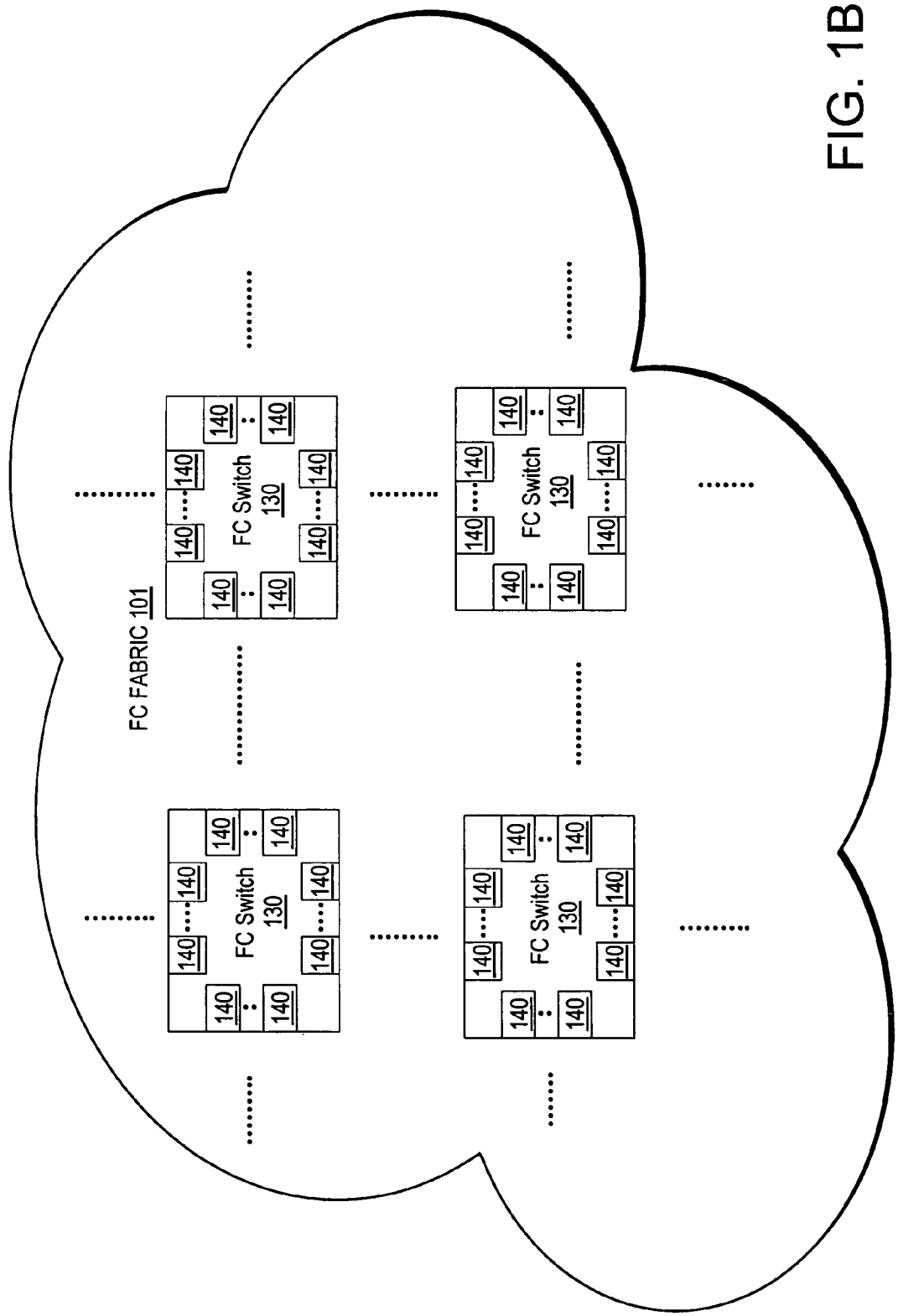
FIG. 1B illustrates greater detail of the Fibre Channel fabric of the network of FIG. 1A.

Referring now to FIGS. 1A and 1B, one embodiment of a data processing network 100 suitable for implementing the invention is depicted. Network 100 includes a storage area network (SAN) 105 that is preferably Fibre Channel compliant. Fibre Channel is a scalable technology data transfer interface technology (currently predominantly implemented with a GPS data transfer rate) that maps several common transport protocols, including Internet Protocol (IP) and SCSI, allowing it to merge high-speed I/O and networking functionality in a single connectivity technology. Fibre Channel is a set of open standards defined by ANSI and ISO. Detailed information regarding the various Fibre Channel standards is available from ANSI Accredited Standards Committee (ASC) X3T11 (www.t11.org), which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

The depicted embodiment of SAN 105 includes a set of nodes 120 that are interconnected through a Fibre Channel fabric 101. The nodes 120 of network 100 may include any of a variety of devices or systems including, as shown in FIG. 1A, one or more data processing systems (computers) 102, tape subsystems 104, RAID devices 106, disk subsystems 108, Fibre Channel arbitrated loops (FCAL) 110, and other suitable data storage and data processing devices. One or more nodes 120 of network 100 may be connected to an external network denoted by reference numeral 103. Thr external network 103 may be a local area network (LAN) or an IP supported network such as the Internet. Typically, Fibre Channel fabric 101 includes one of more interconnected Fibre Channel switches 130, each of which includes a set of Fibre Channel ports 140. Each port 140 typically includes a connector, a transmitter, a receiver, and supporting logic for one end of a Fibre Channel link and may further include a controller. Ports 140 act as repeaters for all other ports 140 in fabric 101. Fibre channel ports are described according to their topology type. An F port denotes a switch port (such as are shown in FIG. 1B), an L or NL port denotes an Arbitrated-Loop link (not shown in FIG. 1B), and an FL port denotes an Arbitrated-Loop to Switch connection port. The ports 140 communicate in a standardized manner that is independent of their topology type, allowing Fibre Channel to support inter-topology communication.

Figure 2:
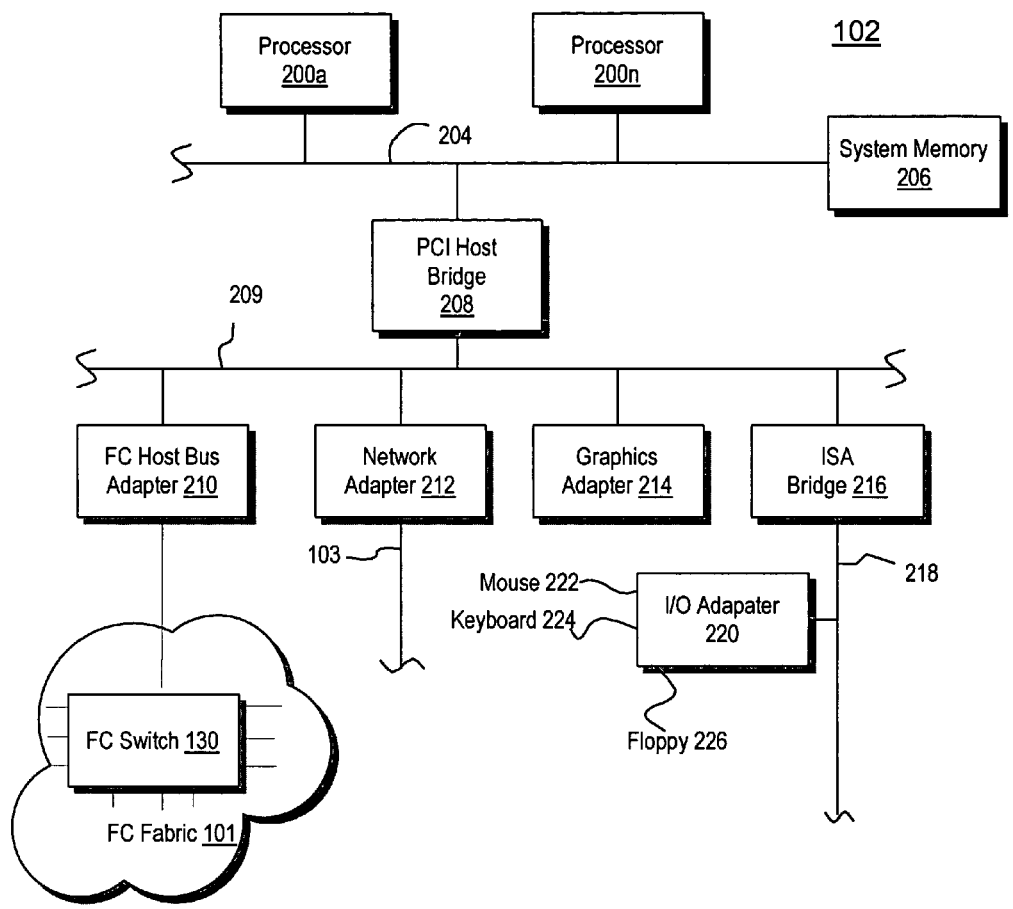
FIG. 2 is a block diagram of a data processing system suitable for connecting as a node to the storage area network of FIG. 1.

Turning now to FIG. 2, a block diagram illustrating one embodiment of a data processing system (computer) 102 that may serve as a node 120 of network 100 is presented. It should be noted that while FIG. 2 describes data processing 102 specifically, the architecture described is common to each node 120 of network 100. Thus, each node 120 may include one or more processors, a system bus, system memory, an I/O bus, and I/O adapters including a host bus adapter (HBA) suitable for connecting to a port 140 of a Fibre Channel switch as described below with specific reference to computer 102. The depicted embodiment of computer 102 includes one or more processors 200a through 200n (generically or collectively referred to herein as processor(s) 200) that are interconnected via a system bus 204. Processors 200 may be implemented as reduced instruction set processors such as the PowerPC® family of processors from IBM Corporation. In other embodiments, processors 200 may comprise Sparc® processors from Sun Microsystems, x86 compatible processors such as the Pentium® family processors from Intel Corporation, or any of a variety of other suitable processor architectures.

Processors 200 are connected to a system memory 206 via system bus 204. The system memory may contain operating system software (or portions thereof) such as the AIX® operating system from IBM, various UNIX® based operating systems, or a Windows® operating system from Microsoft. The system bus 204 is connected to an I/O bus 209 via a host bridge 208. In the depicted embodiment, host bridge 208 and I/O bus 209 are compatible with the Peripheral Components Interface (PCI) protocol as specified in the PCI Local Bus Specification Rev. 2.2, which is available from the PCI Special Interest Group at (www.pcisig.com). PCI compliant I/O bus 209 provides a processor-independent data path between processors 200 and various peripherals including a network adapter 212 and graphics adapter 214. Other peripheral devices including a hard disk may be connected to I/O bus 209. Additionally, a PCI-to-PCI bridge (not depicted) may be connected to bus 209 to provide one or more additional PCI compliant busses. A bridge 216 provides an interface between PCI I/O bus 209 and an Industry Standard Architecture (ISA) bus 218, to which various I/O devices such as a mouse 222, keyboard 224, and floppy drive 226 are connected via an I/O adapter 220.

The depicted embodiment of computer 102 includes a Fibre Channel HBA 210 connected to PCI I/O bus 209. HBA 210 provides a connector and supporting logic suitable for connecting a node 120 such as computer 102 to the Fibre Channel fabric 101. More specifically, with reference to FIG. 3, HBA 210 provides a connector that is suitable for connecting through a link 303 to a port 140 of a Fibre Channel switch 130 within Fiber Channel fabric 101. Link 303 may be implemented as a copper or optical fiber in compliance with the Fiber Channel specification.

The Fibre Channel specification requires a node 120 to perform a fabric login whenever a computer (or other node) attempts to establish a connection between two endpoints of Fabric 101. As an open standard, however, the fabric login defined by the Fibre Channel specification does not provide a secure mechanism for ensuring that access to SAN 105 is authorized. If an unauthorized user manages to access HBA 210, possibly via an external network 103 such as the Internet, the security of all data on SAN 105 may be jeopardized. The invention contemplates a strongly authenticated procedure and mechanism to minimize the risk of unauthorized access to the Fibre Channel compliant SAN 105. This procedure may be incorporated into the Fibre Channel specified fabric login sequence itself or may be implemented as part of an Extended Login Service (ELS). The ELS is a Fibre Channel specified utility that is suitable for implementing extensions to the existing Fibre Channel specified login sequence.

Figure 3:
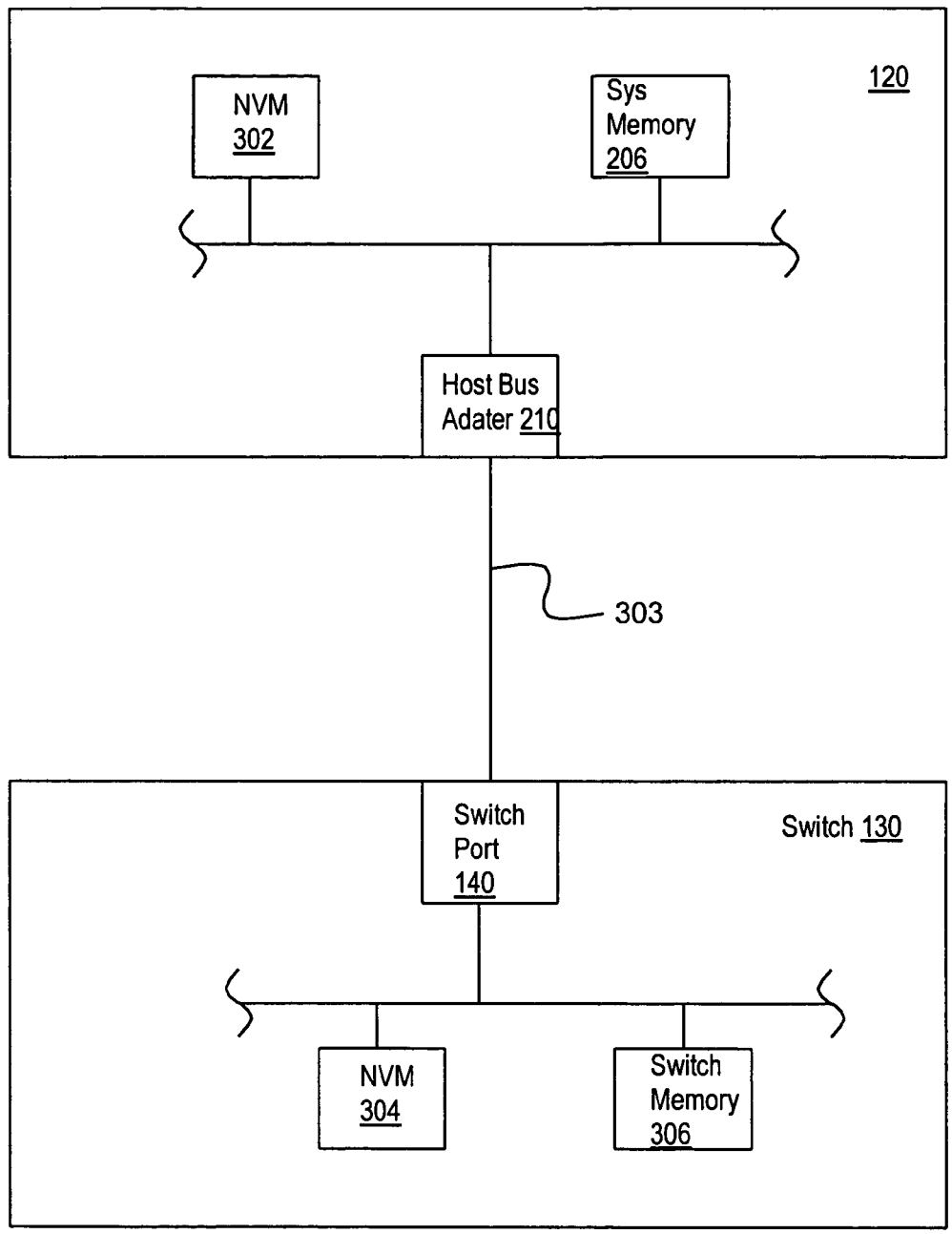
FIG. 3 is a simplified block diagram illustrating a link between a fabric switch in the storage area network and an endpoint node.
Figure 4:
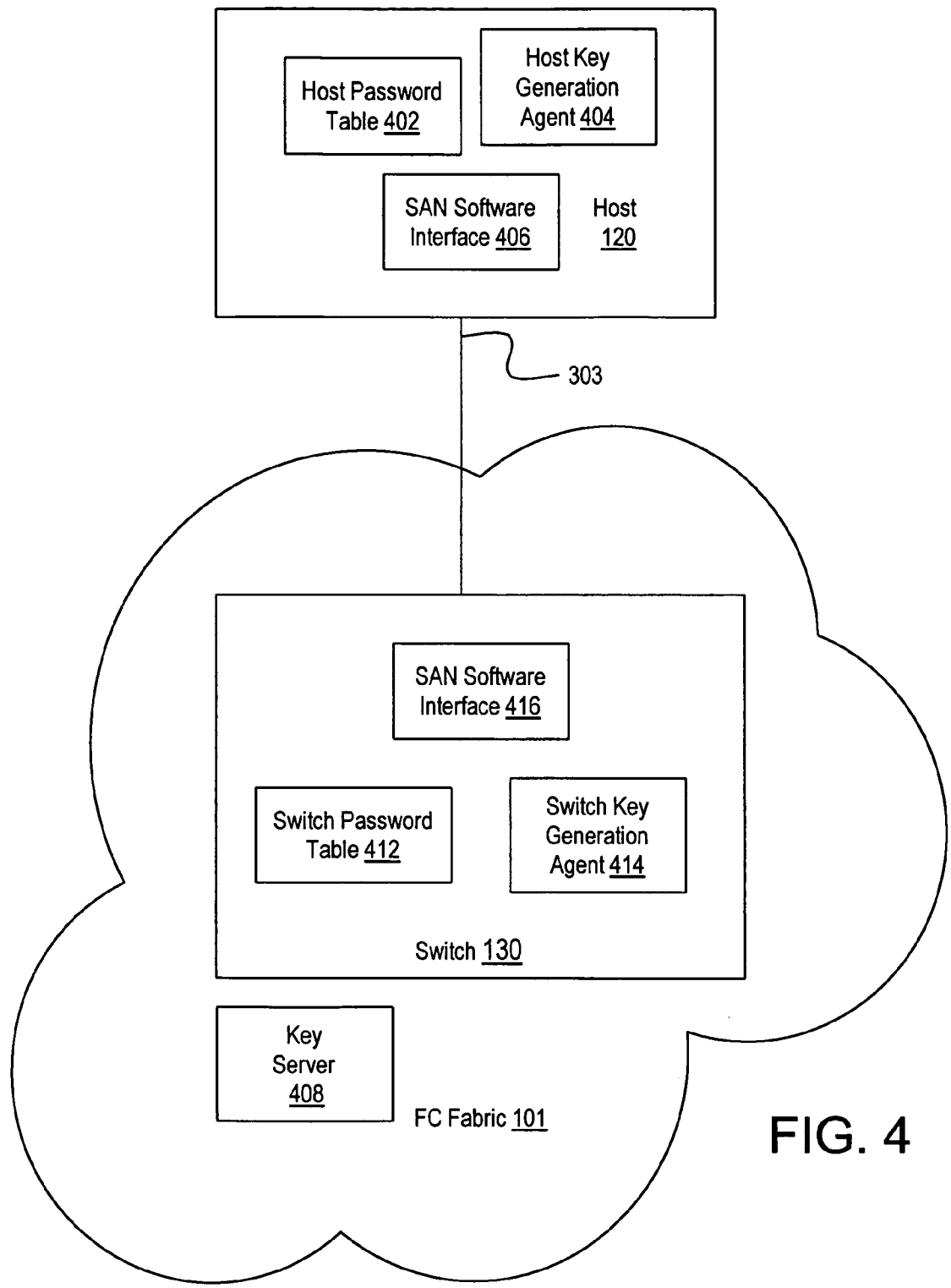
FIG. 4 depicts the software components of a storage area network authentication mechanism according to one embodiment of the present invention.

Referring now to FIGS. 3 and 4, block diagrams illustrating hardware and software components respectively that are used in conjunction with an authenticated Fibre Channel fabric login sequence as described herein are presented. In the depicted embodiment, a node 120 and a switch 130 form a Fibre Channel connection. More specifically, a HBA 210 on node 120 is connected to a switch port 140 of switch 130 via a copper or fiber optic cable 303. The node 120 includes a non-volatile memory device 302 and a system memory 206 that are accessible to host bus adapter 210 via one or more busses. Similarly on the switch side of the connection, switch 130 includes a non-volatile storage device 304 and a switch memory 306 that are accessible to switch port 140.

In the depicted embodiment, the Fibre Channel fabric 101 includes a key server application 408 that is responsible for generating encryption keys and password tables according to the present invention. The key server 408, which is preferably launched only by an administrator or user with privileged access to the application, spawns key generation agents 404 and 414 on node 120 (also referred to as host 120) and switch 130 respectively. In one embodiment, key server 408 is responsible for generating keys and passwords tables for each node-port pair in fabric 100. The key server 408 is preferably executed periodically to generate new encryption keys and passwords tables as an added security measure. In the preferred embodiment, a unique encryption key and password table is generated for each node-port pair. A copy of the key and password table for each node-port pair is stored on both the host side (indicated in FIG. 4 by Host Password Table 402) and on the switch side (Switch Password Table 412). The password tables 402 and 412, which may include the key generated by key server 408, are preferably stored in non-volatile memory devices 302 and 304 to prevent loss of the keys and table when power is removed from the corresponding device. The key generation agents (or portions thereof), on the other hand, typically reside in the system memory 206 or switch memory 306 when executing. The key and password tables 402 and 412 are preferably stored in a secret location of non-volatile memory devices 302 and 304. This secret location is known only to the key generating agents 404 and 414 that reside on host 120 and switch 130 respectively.

The encryption keys and password tables that are generated by key server 408 should be transferred to the various hosts via an entrusted mechanism. In one embodiment, the keys and passwords tables could be generated and stored on a portable storage device such as a floppy diskette and manually installed on each host by an administrator or other privileged and entrusted user. In another embodiment, the keys and passwords tables may be delivered to each host 120 over an external network via a trusted, and preferably encrypted link. A secure IP link, for example, might be used to distribute the various keys and password tables to each node 120. This distribution method might itself be performed with an application requiring secure access such as a passworded application.

In addition to the authentication procedure described in greater detail below, the invention may include the use of software/hardware binding to further secure access to the Fibre Channel fabric 101. Generally speaking the binding function includes the generation of a binding code based upon a unique number (such as the serial number) associated with each hardware device endpoint. During a system power up or software reset, software compares the binding code of each link against the serial number (or other unique number) of each attached hardware device. If the code does not correspond to the associated serial number, the connection to the SAN is aborted and reported to an administrator.

Figure 5:
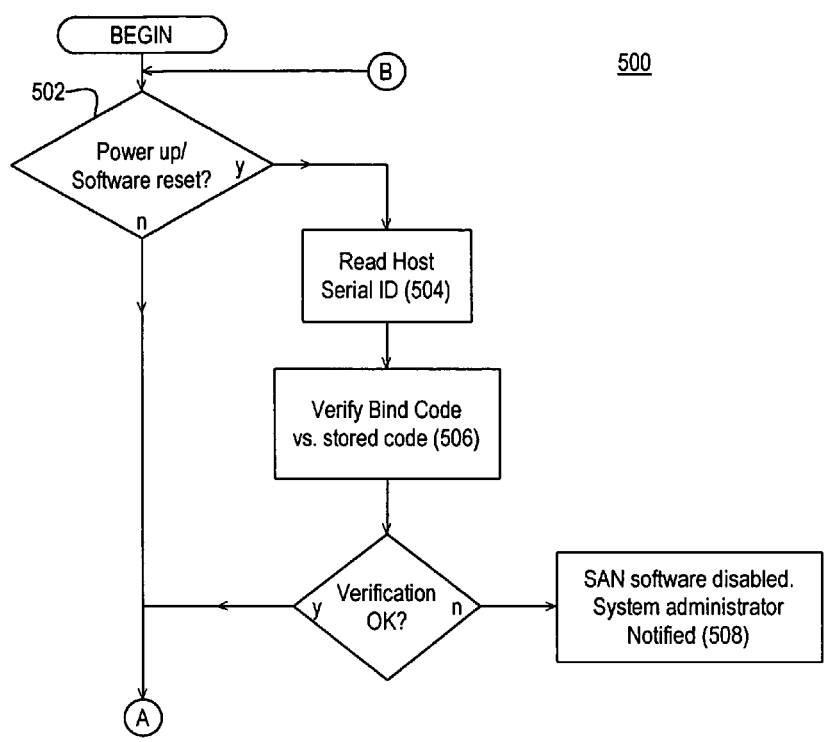
FIG. 5 is a flow diagram illustrating a method of authenticating a storage area network according to one embodiment of the invention.

Referring now to FIG. 5, a flow diagram of one embodiment of a Fibre Channel fabric authentication mechanism and method 500 as contemplated is presented. The method 500 may be implemented as a computer program product (software) in which a set of processor executable instructions for authenticating access to SAN 105 are stored on a computer readable medium such as a floppy diskette, CD ROM, hard drive, tape storage, a non-volatile memory device such as a PROM, EEPROM, or flash device, or in a system memory or cache memory associated with one or more processors. Various portions of the software may be executed by a processor on a node 120 while others may be executed by a processor in a switch 130 of network 100. Similarly, various portions of a software implementation of method 500 may comprise portions of switch's SAN software interface 416 or the node's software interface 406. In one embodiment (as depicted in FIG. 4) the authentication is performed by software interfaces 406 and 416 on either side of the link. The host software interface monitors the host for events that trigger portions of the authentication mechanism. If, for example, a power up or software reset is detected (block 502) the host software interface 406 will read (block 504) an identifying number of the host device (such as the serial number). From the serial number, software interface 406 can generate a bind code and compare (block 506) the generated bind code against that was stored when the bind codes were originally generated (such as when the host 120 was initially installed). If the generated bind code and the stored bind code do not match, the software interface is disabled (block 508) and the system administrator is notified. The bind code may be further enhanced by incorporating additional information in the code. A time stamp and date stamp may be used when the bind code is initially generated. If the time stamp and date stamp detected during a subsequent power on or software reset are not chronologically greater than (i.e., after) the originally detected date and time stamps, the software may abort. This hardware/software binding prevents an unauthorized user from physically swapping an unauthorized HBA for an authorized MBA as a means of gaining unauthorized access to SAN 105. Similarly, the binding codes prevents an unauthorized user from installing an unauthorized version of software interface 406 in an attempt to access SAN 105. Thus, the described binding mechanism provides an additional level of security for SAN 105. When a power up sequence or software reset occurs, the unauthorized HBA and/or software interface will be unable to retrieve the required binding codes thereby preventing access to the key generation application, without which the user will be unable to access SAN 105.

Assuming that a power up sequence has been performed successfully and the bind code of each hard device is verified (and assuming no software reset events occur), software interface 406 will monitor for an event that triggers an authenticated fabric login sequence according to the present invention. Preferably, the authenticated login sequence is launched each time there is a normal switch login and each time there is an abnormal switch event (login or logout). Upon the occurrence of such an event, software interface 406 requests (block 510) a login to switch 130. In response, a software interface 416 on switch 130 generates a random hash (block 512) into password table 412. A password is then retrieved from the password table 412 based upon the random hash. This password, itself, represents a hash into password table 412. Software interface 416 determines from table 412 a response value that corresponds to the hash represented by the retrieved password, Software interface 416 stores (block 516) this response locally and encrypts (block 518) the corresponding password according to the encryption key that is stored in a secret and preferably non-volatile location on switch 130. The encrypted password is then sent (block 520) to host 120 wherein software interface 406 decrypts the password (block 522) based upon its locally stored copy of the encryption key (which is the same as the encryption key stored in switch 130) and uses the decrypted password to hash into host password table 402. The location of host password table 402, like the location of switch password table 412 is known only to the corresponding software interface. Upon retrieving the password from its password table 402, software interface 406 encrypts (block 524) the response according to its locally stored encryption key sends the response back to switch 130. Upon receiving the encrypted response from host 120, software interface 416 decrypts the response using the encryption key and compares the received response with the value of the response stored in block 516. If the response matches, software interface 416 permits (block 530) the login to Fibre Channel fabric 101 and informs the requestor of successful completion. If the response does not match the fabric login is denied (block 528) and the requestor is prevented from accessing fabric 101.

The described authentication method thus provides a challenge-response form of authorizing access to a protected or critical resource such as SAN 105. The challenge-response authentication requires both parties to a link to agree on a common password (or passwords). Because the agreement is based on a common and secret encryption based mechanism, the authentication is effective in preventing a "sniffer" from stealing the password(s) because the passwords travel over the link in an encrypted format.

It will be apparent to those skilled in the art having the benefit of this disclosure that the present invention contemplates a strongly authenticated access to a Fibre Channel SAN. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of accessing a storage area network (SAN), comprising:
   retrieving a first value from a first copy of a password table;
   using the first value to retrieve a second value from the first copy of the password table;
   encrypting the first value according to a first copy of an encryption key;
   sending the encrypted first value to a node of the SAN;
   decrypting the encrypted first value according to a second copy of the encryption key;
   using the decrypted first value to retrieve a third value from a second copy of the password table;
   encrypting the third value according to the second copy of the encryption key and sending the encrypted third value back to a switch of the SAN;
   decrypting the third value according to the first copy of the encryption key and comparing the decrypted third value with the second value; and
   allowing access to the SAN if the third value and the second value match.

2. A method of claim 1, further comprising:
   responsive to an event selected from a power on event and a software reset event, reading a serial identification corresponding to a host;
   generating a code value based upon the serial number;
   comparing the generated code value with a previously determined code value; and
   denying access to the SAN if the generated code value and the previously determined code value differ.

3. The method of claim 2, wherein the code value is further based on a time stamp and date stamp.

4. The method of claim 1, wherein the SAN is a Fibre Channel compliant SAN.

5. The method of claim 1, further comprising, periodically executing a key generation application that generates a unique password table and encryption key for each node attached to the SAN.

6. The method of claim 1, wherein retrieving the first value comprises randomly accessing an entry in the first copy of the password table and retrieving the first value from the randomly accessed entry.

7. The method of claim 6, wherein using the first value to retrieve a second value comprises hashing the first value to determine a second entry in the password table and retrieving the second value from the second entry.

8. The method of claim 1, wherein the password tables and encryption keys for each node are distributed over an encrypted link.

9. A computer program product comprising a computer readable storage medium containing instructions for authorizing access to a storage area network, the instructions comprising:
   a retriever enabled to retrieve a first value from a first copy of a password table;
   means for using the retriever and the first value to retrieve a second value from the first copy of the password table;
   an decryptor for encrypting the first value according to a first copy of an encryption key;
   means for sending the encrypted first value to a node of the SAN;
   a decryptor for decrypting the encrypted first value according to a second copy of the encryption key;
   means for using the decrypted first value to retrieve a third value from a second copy of the password table;
   means for encrypting the third value according to the second copy of the encryption key and sending the encrypted third value back to a switch of the SAN;
   means for decrypting the third value according to the first copy of the encryption key and comparing the decrypted third value with the second value; and
   means for allowing access to the SAN if the third value and the second value match.

10. The computer program product of claim 9, further comprising:
    a reader enabled to determine a serial identification corresponding to a host in response to an detecting an event selected from a power on event and a software reset event;
    a code value generator enabled to generate a code value based upon the serial number;
    a comparator enable to compare the generated code value with a previously determined code value; and
    means for denying access to the SAN if the generated code value and the previously determined code value differ.

11. The computer program product of claim 10, wherein the code value is further based on a time stamp and date stamp.

12. The computer program product of claim 9, further comprising, a key generation application that generates a unique password table and encryption key for each node attached to the SAN.

* * * * *